US012073805B2

(12) United States Patent
Ban

(10) Patent No.: US 12,073,805 B2
(45) Date of Patent: Aug. 27, 2024

(54) PIXEL CHARGING METHOD AND DISPLAY PANEL

(71) Applicant: TCL CHINA STAR OPTOELECTRONICS TECHNOLOGY CO., LTD., Guangdong (CN)

(72) Inventor: Youngil Ban, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/614,734

(22) PCT Filed: Nov. 10, 2021

(86) PCT No.: PCT/CN2021/129858
§ 371 (c)(1),
(2) Date: Nov. 29, 2021

(87) PCT Pub. No.: WO2023/077535
PCT Pub. Date: May 11, 2023

(65) Prior Publication Data
US 2024/0029680 A1 Jan. 25, 2024

(30) Foreign Application Priority Data
Nov. 2, 2021 (CN) ........................ 202111290435.0

(51) Int. Cl.
*G09G 3/36* (2006.01)

(52) U.S. Cl.
CPC ......... *G09G 3/3614* (2013.01); *G09G 3/3648* (2013.01); *G09G 2310/0251* (2013.01); *G09G 2320/0209* (2013.01)

(58) Field of Classification Search
CPC .................................................... G09G 3/3614
See application file for complete search history.

(56) References Cited

U.S. PATENT DOCUMENTS

2002/0084960 A1 7/2002 Song et al.
2016/0093258 A1* 3/2016 Ahn .................... G09G 3/3688 345/96

(Continued)

FOREIGN PATENT DOCUMENTS

CN 105047170 A 11/2015
CN 107507594 A 12/2017

(Continued)

OTHER PUBLICATIONS

International Search Report in International application No. PCT/CN2021/129858, mailed on Jul. 27, 2022.

(Continued)

*Primary Examiner* — William Boddie
*Assistant Examiner* — Andrew B Schnirel

(57) ABSTRACT

The application provides a pixel charging method and a display panel. In the pixel charging method and the display panel of the application, during a first frame of image, a positive signal is inputted to a part of data lines, and after a first predetermined time length, a negative signal is inputted to the other data lines; during a second frame of image, the negative signal is inputted to a part of the data lines, and after a second predetermined time length, the positive signal is inputted to the other data lines to change the phase of the positive and negative signals.

17 Claims, 3 Drawing Sheets

(56) References Cited

U.S. PATENT DOCUMENTS

| | | | | |
|---|---|---|---|---|
| 2016/0379579 | A1* | 12/2016 | Cho | G09G 3/3614 345/214 |
| 2018/0047351 | A1 | 2/2018 | Yan | |
| 2019/0057667 | A1* | 2/2019 | Pyun | G09G 3/3688 |
| 2021/0304698 | A1 | 9/2021 | Gao | |

FOREIGN PATENT DOCUMENTS

| | | | |
|---|---|---|---|
| CN | 109192168 | A | 1/2019 |
| CN | 111276109 | A | 6/2020 |
| CN | 111489717 | A | 8/2020 |
| JP | 2007310199 | A | 11/2007 |
| JP | 2020524306 | A | 8/2020 |
| KR | 20160049166 | A | 5/2016 |

OTHER PUBLICATIONS

Written Opinion of the International Search Authority in International application No. PCT/CN2021/129858, mailed on Jul. 27, 2022.
Chinese Office Action issued in corresponding Chinese Patent Application No. 202111290435.0 dated Dec. 20, 2022, pp. 1-7.
Chinese Decision of Rejection issued in corresponding Chinese Patent Application No. 202111290435.0 dated Jun. 15, 2023, pp. 1-6.
Japanese Office Action issued in corresponding Japanese Patent Application No. 特願 2021-568782 dated Dec. 12, 2023, pp. 1-3.
Korean Office Action issued in corresponding Korean Patent Application No. 10-2022-7001228 dated Nov. 28, 2023, pp. 1-5.

* cited by examiner

PIXEL CHARGING METHOD AND DISPLAY PANEL

FIELD OF THE DISCLOSURE

The present application relates to display technologies, and more particularly to a pixel charging method and a display panel.

DESCRIPTION OF RELATED ARTS

FIG. 1 is a schematic diagram illustrating pixel charging of an existing display panel. As shown in FIG. 1, charging duration for positive and negative polarities is the same for the existing display panel. A positive signal signal P and a negative signal N are transmitted to the data lines simultaneously. Since the falling edge of a gate signal Gate occupies a long time, the duration of pixel charging V+ applied by the positive signal P may be insufficient and mischarge may occur in case of pixel charging V− applied by the negative signal N. Based on this, the charging may be improved by having a time difference between outputs of the positive signal and the negative signal.

However, when the time difference exists between the outputs of the positive signal and the negative signal, power source voltage will drift based on the polarity and power supply interference occurs. The power supply interference will affect common electrode voltage, resulting in horizontal crosstalk when images are displayed.

SUMMARY

Technical Problems

The present application provides a pixel charging method and a display panel, for ensuring that the whole charging rate is high, solving the problems below. when the time difference exists between the outputs of the positive signal and the negative signal, power source voltage will drift based on the polarity and power supply interference occurs. The power supply interference will affect common electrode voltage, resulting in horizontal crosstalk when images are displayed.

Technical Solutions

In a first aspect, the present application provides a pixel charging method, applied to a display panel, the display panel including a pixel array, a first data line and a second data line, both the first data line and the second data line electrically connected to the pixel array, the method including:

during a first frame of image, inputting a positive signal to the first data line, and after a first predetermined time length, inputting a negative signal to the second data line; and during a second frame of image, inputting the negative signal to the first data line, and after a second predetermined time length, inputting the positive signal to the second data line; and the first predetermined time length is equal to the second predetermined time length; both the first predetermined time length and the second predetermined time length are between 0.5 microsecond and 1 microsecond.

In the pixel charging method provided in the present application, the step of during a first frame of image, inputting a positive signal to the first data line, and after a first predetermined time length, inputting a negative signal to the second data line includes:

switching on thin-film transistors of a current row of pixels;

inputting the positive signal to the first data line;

after the first predetermined time length, inputting the negative signal to the second data line;

switching off the thin-film transistors of the current row of pixels.

In the pixel charging method provided in the present application, before the step of switching on thin-film transistors of a current row of pixels, the method further includes:

obtaining a time difference between the time to switch off the thin-film transistor corresponding to the first data line inputted with the positive signal and the time to switch off the thin-film transistor corresponding to the second data line inputted with the negative signal, wherein the first predetermined time length is the length of the time difference.

In the pixel charging method provided in the present application, the step of switching off the thin-film transistors of the current row of pixels includes:

suspending or stopping transmitting a gate signal to the current row of pixels;

postponing switching off the thin-film transistor corresponding to the first data line inputted with the positive signal until a first time length is passed;

postponing switching off the thin-film transistor corresponding to the second data line inputted with the negative signal until a second time length is passed, wherein the second time length is greater than the first time length.

In the pixel charging method provided in the present application, the step of during a second frame of image, inputting the negative signal to the first data line, and after a second predetermined time length, inputting the positive signal to the second data line includes:

switching on thin-film transistors of a current row of pixels;

inputting the negative signal to the first data line;

after the second predetermined time length, inputting the positive signal to the second data line;

switching off the thin-film transistors of the current row of pixels.

In the pixel charging method provided in the present application, before the step of switching on thin-film transistors of a current row of pixels, the method further includes:

obtaining a time difference between the time to switch off the thin-film transistor corresponding to the first data line inputted with the negative signal and the time to switch off the thin-film transistor corresponding to the second data line inputted with the positive signal, wherein the second predetermined time length is the length of the time difference.

In the pixel charging method provided in the present application, the step of switching off the thin-film transistors of the current row of pixels includes:

suspending or stopping transmitting a gate signal to the current row of pixels;

postponing switching off the thin-film transistor corresponding to the first data line inputted with the negative signal until a first time length is passed;

postponing switching off the thin-film transistor corresponding to the second data line inputted with the positive signal until a second time length is passed, wherein the second time length is greater than the first time length.

In a second aspect, the present application provides a pixel charging method, applied to a display panel, the display panel including a pixel array, a first data line and a second data line, both the first data line and the second data line electrically connected to the pixel array, the method including:

during a first frame of image, inputting a positive signal to the first data line, and after a first predetermined time length, inputting a negative signal to the second data line; and during a second frame of image, inputting the negative signal to the first data line, and after a second predetermined time length, inputting the positive signal to the second data line.

In the pixel charging method provided in the present application, the first predetermined time length is equal to the second predetermined time length.

In the pixel charging method provided in the present application, the step of during a first frame of image, inputting a positive signal to the first data line, and after a first predetermined time length, inputting a negative signal to the second data line includes:

switching on thin-film transistors of a current row of pixels;

inputting the positive signal to the first data line;

after the first predetermined time length, inputting the negative signal to the second data line;

switching off the thin-film transistors of the current row of pixels.

In the pixel charging method provided in the present application, before the step of switching on thin-film transistors of a current row of pixels, the method further includes:

obtaining a time difference between the time to switch off the thin-film transistor corresponding to the first data line inputted with the positive signal and the time to switch off the thin-film transistor corresponding to the second data line inputted with the negative signal, wherein the first predetermined time length is the length of the time difference.

In the pixel charging method provided in the present application, the step of switching off the thin-film transistors of the current row of pixels includes:

suspending or stopping transmitting a gate signal to the current row of pixels;

postponing switching off the thin-film transistor corresponding to the first data line inputted with the positive signal until a first time length is passed;

postponing switching off the thin-film transistor corresponding to the second data line inputted with the negative signal until a second time length is passed, wherein the second time length is greater than the first time length.

In the pixel charging method provided in the present application, the step of during a second frame of image, inputting the negative signal to the first data line, and after a second predetermined time length, inputting the positive signal to the second data line includes:

switching on thin-film transistors of a current row of pixels;

inputting the negative signal to the first data line;

after the second predetermined time length, inputting the positive signal to the second data line;

switching off the thin-film transistors of the current row of pixels.

In the pixel charging method provided in the present application, before the step of switching on thin-film transistors of a current row of pixels, the method further includes:

obtaining a time difference between the time to switch off the thin-film transistor corresponding to the first data line inputted with the negative signal and the time to switch off the thin-film transistor corresponding to the second data line inputted with the positive signal, wherein the second predetermined time length is the length of the time difference.

In the pixel charging method provided in the present application, the step of switching off the thin-film transistors of the current row of pixels includes:

suspending or stopping transmitting a gate signal to the current row of pixels;

postponing switching off the thin-film transistor corresponding to the first data line inputted with the negative signal until a first time length is passed;

postponing switching off the thin-film transistor corresponding to the second data line inputted with the positive signal until a second time length is passed, wherein the second time length is greater than the first time length.

In the pixel charging method provided in the present application, both the first predetermined time length and second predetermined time length are between 0.5 microsecond and 1 microsecond.

In a third aspect, the present application further provides a display panel, including:

a first charging module, configured to, during a first frame of image, input a positive signal to the first data line, and after a first predetermined time length, input a negative signal to the second data line; and a second charging module, configured to, during a second frame of image, input the negative signal to the first data line, and after a second predetermined time length, input a positive signal to the second data line.

BENEFICIAL EFFECTS

In the pixel charging method of the present application, during the first frame of image, the positive signal is inputted to a part of the data lines, and after the first predetermined time length, the negative signal is inputted to the other data lines, and in such a way, the phase of the positive and negative signals is changed (positive polarity is at the front and negative polarity is at the rear); during the second frame of image, the negative signal is inputted to a part of the data lines, and after the second predetermined time length, the positive signal is inputted to the other data lines, and in such a way, the phase of the positive and negative signals is changed (negative polarity is at the front and positive polarity is at the rear). That is, during the first frame of image, the power source voltage will drift based on the polarity and has a first time of power supply interference; during the second frame of image, the power source voltage will drift based on the polarity and has a second time of power supply interference. By cancelling each other out for the two times of interference, it is ensured that the entire charging rate is high as well as it is avoided that horizontal crosstalk when images are displayed.

DESCRIPTION OF DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

DESCRIPTION OF EMBODIMENTS OF THE DISCLOSURE

The technical solutions in the embodiments of the present application will be clearly and completely described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application. It should be understood that the specific embodiments described herein are merely for illustrating and interpreting the present application and the present application is not limited thereto. In the specification and claims of the present application, the terms “first”, “second” and so on are intended to distinguish different objects rather than to indicate a specific order.

Figure 1:
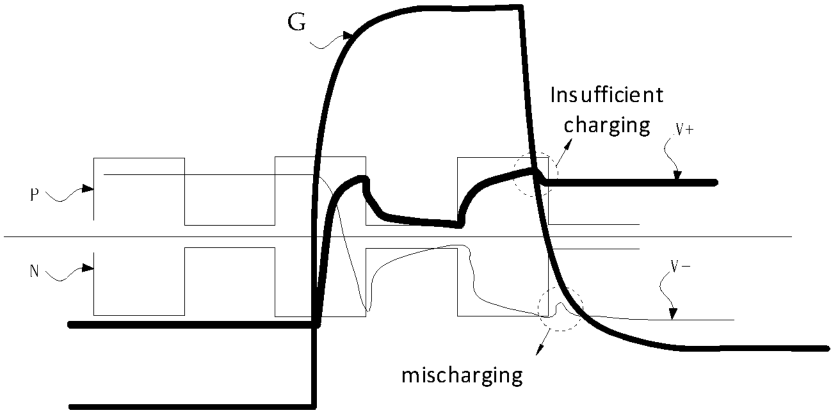
Prior Art FIG. 1
FIG. 1 is a schematic diagram illustrating pixel charging of an existing display panel.
Figure 2:
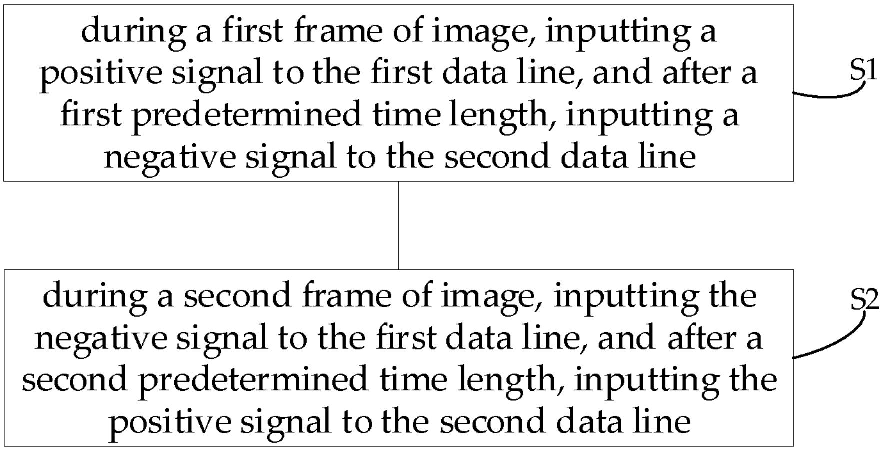
FIG. 2 is a schematic flowchart of a pixel charging method according to an embodiment of the present application.

FIG. 2 is a schematic flowchart of a pixel charging method according to an embodiment of the present application. The embodiment of the present application provides a pixel charging method, which is used for a display panel. The display panel is a liquid crystal display panel.

The display panel includes a pixel array and data lines electrically connected to the pixel array. The data lines include a first data line and a second data line. Both the first data line and the second data line are electrically connected to the pixel array. The pixel charging method of the embodiment of the present application includes:

Step S1: during a first frame of image, inputting a positive signal to the first data line, and after a first predetermined time length, inputting a negative signal to the second data line;

Step S2: during a second frame of image, inputting the negative signal to the first data line, and after a second predetermined time length, inputting the positive signal to the second data line.

In the pixel charging method of the embodiment of the present application, during the first frame of image, the positive signal is inputted to a part of the data lines, and after the first predetermined time length, the negative signal is inputted to the other data lines, and in such a way, the phase of the positive and negative signals is changed (positive polarity is at the front and negative polarity is at the rear); during the second frame of image, the negative signal is inputted to a part of the data lines, and after the second predetermined time length, the positive signal is inputted to the other data lines, and in such a way, the phase of the positive and negative signals is changed (negative polarity is at the front and positive polarity is at the rear). That is, during the first frame of image, the power source voltage will drift based on the polarity and has a first time of power supply interference; during the second frame of image, the power source voltage will drift based on the polarity and has a second time of power supply interference. By cancelling each other out for the two times of interference, it is ensured that the entire charging rate is high as well as it is avoided that horizontal crosstalk when images are displayed.

Figure 3:
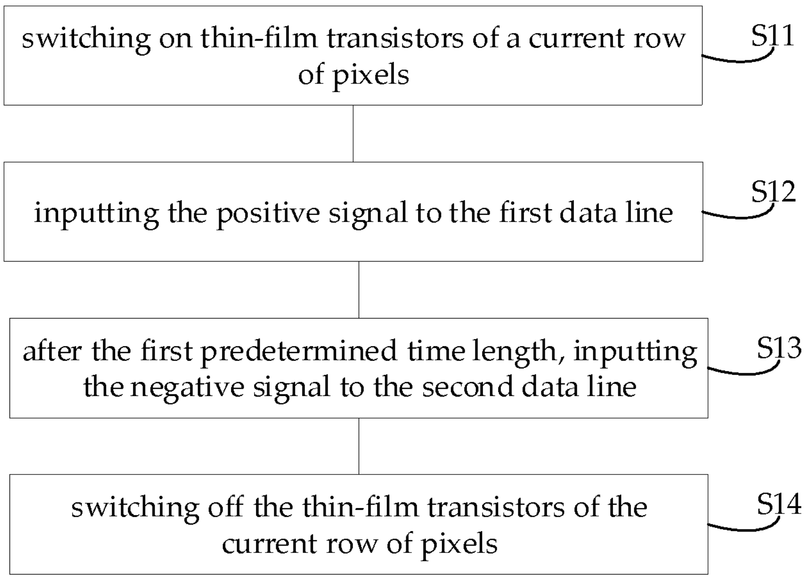
FIG. 3 is a schematic flowchart of a first specific type of pixel charging method according to an embodiment of the present application.

FIG. 3 is a schematic flowchart of a first specific type of pixel charging method according to an embodiment of the present application. With reference to FIG. 2 and FIG. 3, the step of during the first frame of image, inputting the positive signal to the first data line, and after the first predetermined time length, inputting the negative signal to the second data line includes:

Step S11: switching on thin-film transistors of a current row of pixels;

Step S12: inputting the positive signal to the first data line;

Step S13: after the first predetermined time length, inputting the negative signal to the second data line;

Step S14: switching off the thin-film transistors of the current row of pixels.

In Step S11, the display panel may include a display substrate, and a plurality of rows of scan lines, a plurality of columns of data lines, and multiple rows and columns of pixels disposed on the display substrate. It is to be understood that each pixel is electrically connected to one row of scan line and one column of data line, and when a gate signal is inputted to a certain row of scan line to switch on thin-film transistors and a voltage signal is written to a certain column of data line, the voltage signal can charge the pixel connected to the row of scan line and the column of data line. Optionally, the gate of the thin-film transistor of each pixel is electrically connected to one scan line, and the source or the drain of the thin-film transistor of each pixel is electrically connected to one data line.

In Step S12, the positive signal may be inputted to the first data line based on a result from confirmation on the polarity of the voltage signal that is required to be inputted to either the first data line or the second data line. For example, it is required to input the positive signal to the first data line during an i-th frame of image (where i is a positive integer) based on the confirmation result. Then, when the thin-film transistors of the current row are switched on, the first data line is inputted with the positive signal.

In Step S13, on the basis of the example mentioned in Step S12, the negative signal is to be inputted to the second data signal based on the confirmation result. Then, after the first predetermined time length, the second data line is inputted with the negative signal. Optionally, the first predetermined time length may be between 0.5 microsecond (including 0.5 microsecond) and 1 microsecond (including 1 microsecond). In the present embodiment, the first predetermined time length can be 0.6 microsecond, 0.7 microsecond, microsecond or 0.9 microsecond.

Figure 4:
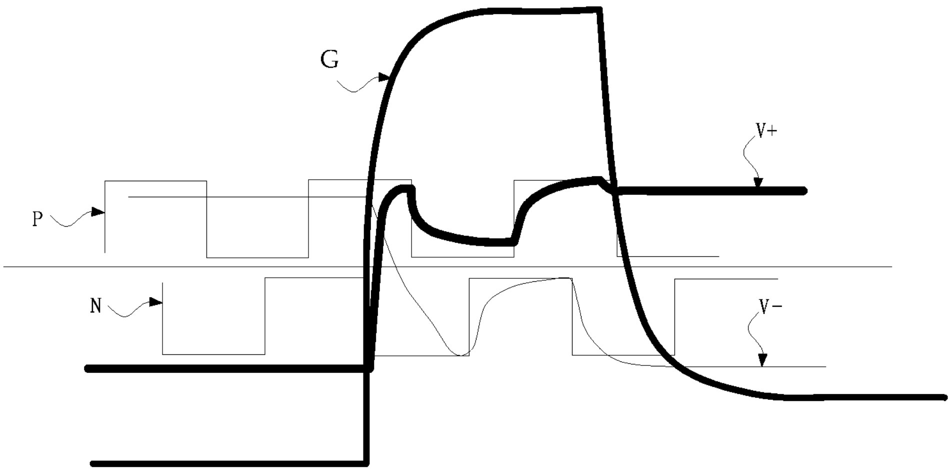
FIG. 4 is a schematic diagram illustrating a first type of charging of a display panel according to an embodiment of the present application.

FIG. 4 is a schematic diagram illustrating a first type of charging of a display panel according to an embodiment of the present application. In the pixel charging method of the embodiment of the present application, by using a gate signal to control the thin-film transistor be switched on and off, the positive signal is earlier than the negative signal by the first predetermined time length and they are inputted to corresponding data lines to change the phase of the positive signal P and the negative signal N (positive polarity is at the front and negative polarity is at the rear), thereby increasing charging duration of the positive signal P, improving the charging rate, decreasing charging duration of the negative signal N, avoiding mischarge, and thereby improving the whole charging rate of the display panel.

In Step S14, the step of switching off the thin-film transistors of the current row of pixels includes suspending or stopping transmitting a gate signal to the current row of pixels; postponing switching off the thin-film transistor corresponding to the first data line inputted with the positive signal until a first time length is passed; postponing switching off the thin-film transistor corresponding to the second data line inputted with the negative signal until a second time length is passed. The second time length is greater than the first time length.

Specifically, suspending or stopping transmitting the gate signal to the current row of pixels means disabling the gate signal of the current row of scan line. Since the falling edge of the gate signal occupies a long time, the voltage of the positive signal is high and the voltage of the negative signal is low, the thin-film transistor corresponding to the positive signal will be switched off earlier than the thin-film transistor corresponding to the negative signal even in case of the same gate signal.

Before the step of switching on the thin-film transistors of the current row of pixels, the method further includes obtaining a time difference between the time to switch off the thin-film transistor corresponding to the first data line inputted with the positive signal and the time to switch off the thin-film transistor corresponding to the second data line inputted with the negative signal; the first predetermined time length is the length of the time difference.

Specifically, the pixel includes the thin-film transistor and a pixel electrode electrically connected to the thin-film transistor. The thin-film transistor is a P-type transistor or a N-type transistor. In a preparing phase of the display panel, the gate signal of the current row of pixels is switched off such that the thin-film transistors of the current row of pixels are switched off. When the gate signal is lower than the voltage signal of corresponding data line, the thin-film transistor is considered to be switched off. During switching off the thin-film transistor, since the falling edge of the gate signal occupies a long time, the voltage of the positive polarity is high and the voltage of the negative polarity is low, the thin-film transistor corresponding to the positive polarity will be switched off earlier than the thin-film transistor corresponding to the negative polarity even in case of the same gate signal. Therefore, when the positive and negative signals are inputted to corresponding data lines simultaneously, the charging duration for the positive polarity is shorter than the charging duration for the negative polarity.

Because the thin-film transistor corresponding to the positive signal is switched off earlier than the thin-film transistor corresponding to the negative signal, a time difference exists when switching off the two thin-film transistors. The embodiment of the present application is to obtain the length of the time difference. Optionally, the time difference may be an average of or a middle of time differences obtained by switching off the thin-film transistor for many times for the current row, or may be other value.

Optionally, the length of the time difference may be between 0.5 microsecond (including 0.5 microsecond) and 1 microsecond (including 1 microsecond). In the present embodiment, the length of the time difference can be 0.6 microsecond, 0.7 microsecond, microsecond or 0.9 microsecond.

Figure 5:
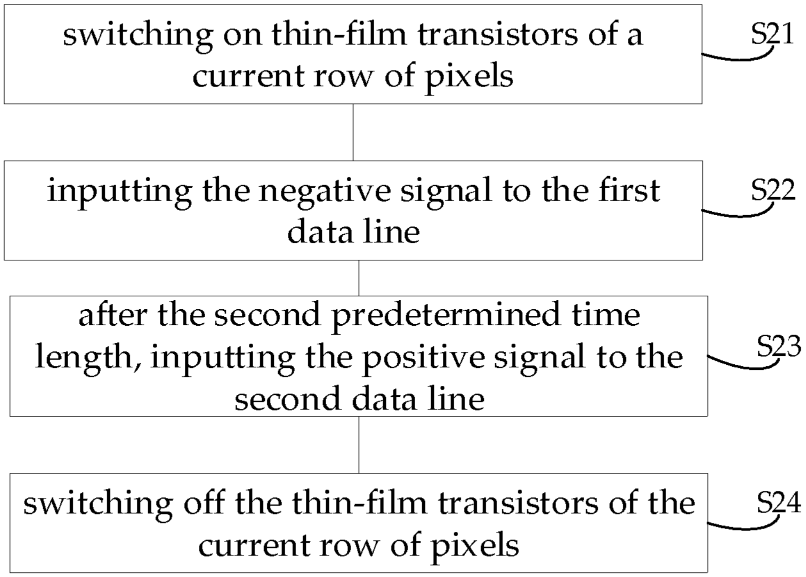
FIG. 5 is a schematic flowchart of a second specific type of pixel charging method according to an embodiment of the present application.

FIG. 5 is a schematic flowchart of a second specific type of pixel charging method according to an embodiment of the present application. With reference to FIG. 2 and FIG. the step of during the second frame of image, inputting the negative signal to the first data line, and after the second predetermined time length, inputting the positive signal to the second data line includes:

Step S21: switching on thin-film transistors of a current row of pixels;

Step S22: inputting the negative signal to the first data line;

Step S23: after the second predetermined time length, inputting the positive signal to the second data line;

Step S24: switching off the thin-film transistors of the current row of pixels.

In Step S21, the display panel may include a display substrate, and a plurality of rows of scan lines, a plurality of columns of data lines, and multiple rows and columns of pixels disposed on the display substrate. It is to be understood that each pixel is electrically connected to one row of scan line and one column of data line, and when a gate signal is inputted to a certain row of scan line to switch on thin-film transistors and a voltage signal is written to a certain column of data line, the voltage signal can charge the pixel connected to the row of scan line and the column of data line. Optionally, the gate of the thin-film transistor of each pixel is electrically connected to one scan line, and the source or the drain of the thin-film transistor of each pixel is electrically connected to one data line.

In Step S22, the negative signal may be inputted to the first data line based on a result from confirmation on the polarity of the voltage signal that is required to be inputted to either the first data line or the second data line. For example, it is required to input the negative signal to the first data line during an i-th frame of image (where i is a positive integer) based on the confirmation result. Then, when the thin-film transistors of the current row are switched on, the first data line is inputted with the negative signal.

In Step S23, on the basis of the example mentioned in Step S12, the negative signal is to be inputted to the second data signal based on the confirmation result. Then, after the second predetermined time length, the second data line is inputted with the positive signal. Optionally, the second predetermined time length may be between 0.5 microsecond (including 0.5 microsecond) and 1 microsecond (including 1 microsecond). In the present embodiment, the second predetermined time length can be 0.6 microsecond, 0.7 microsecond, 0.8 microsecond or 0.9 microsecond.

Figure 6:
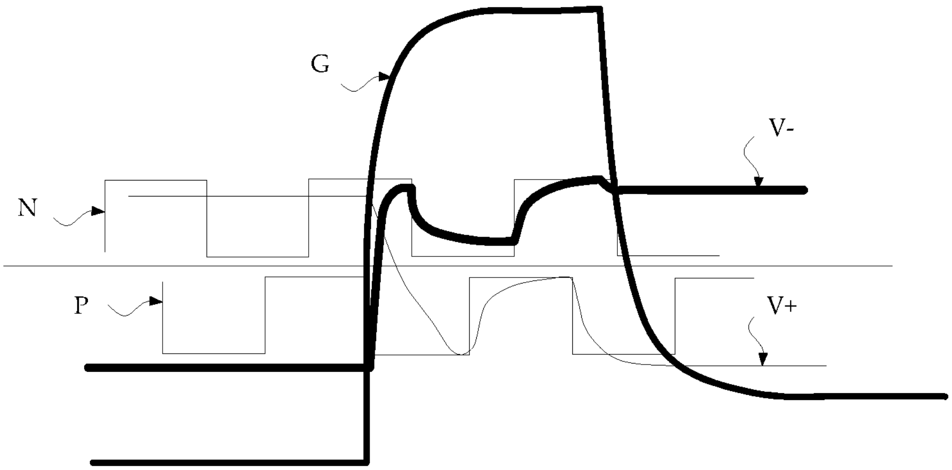
FIG. 6 is a schematic diagram illustrating a second type of charging of a display panel according to an embodiment of the present application.

FIG. 6 is a schematic diagram illustrating a second type of charging of a display panel according to an embodiment of the present application. In the pixel charging method of the embodiment of the present application, by using a gate signal to control the thin-film transistor be switched on and off, the negative signal is earlier than the positive signal by the second predetermined time length and they are inputted to corresponding data lines to change the phase of the positive signal P and the negative signal N (negative polarity is at the front and positive polarity is at the rear), thereby increasing charging duration of the negative signal N, improving the charging rate, decreasing charging duration of the positive signal N, avoiding mischarge, and thereby improving the whole charging rate of the display panel.

In Step S24, the step of switching off the thin-film transistors of the current row of pixels includes suspending or stopping transmitting a gate signal to the current row of pixels; postponing switching off the thin-film transistor corresponding to the first data line inputted with the negative signal until a first time length is passed; postponing switching off the thin-film transistor corresponding to the second data line inputted with the positive signal until a second time length is passed. The second time length is greater than the first time length.

Specifically, suspending or stopping transmitting the gate signal to the current row of pixels means disabling the gate signal of the current row of scan line. Since the falling edge of the gate signal occupies a long time, the voltage of the positive signal is high and the voltage of the negative signal is low, the thin-film transistor corresponding to the positive signal will be switched off earlier than the thin-film transistor corresponding to the negative signal even in case of the same gate signal.

Before the step of switching on the thin-film transistors of the current row of pixels, the method further includes obtaining a time difference between the time to switch off the thin-film transistor corresponding to the first data line inputted with the negative signal and the time to switch off the thin-film transistor corresponding to the second data line inputted with the positive signal; the second predetermined time length is the length of the time difference.

Specifically, the pixel includes the thin-film transistor and a pixel electrode electrically connected to the thin-film transistor. The thin-film transistor is a P-type transistor or a N-type transistor. In a preparing phase of the display panel, the gate signal of the current row of pixels is switched off such that the thin-film transistors of the current row of pixels are switched off. When the gate signal is lower than the voltage signal of corresponding data line, the thin-film transistor is considered to be switched off. During switching off the thin-film transistor, since the falling edge of the gate signal occupies a long time, the voltage of the positive polarity is high and the voltage of the negative polarity is low, the thin-film transistor corresponding to the positive polarity will be switched off earlier than the thin-film transistor corresponding to the negative polarity even in case of the same gate signal. Therefore, when the positive and negative signals are inputted to corresponding data lines simultaneously, the charging duration for the positive polarity is shorter than the charging duration for the negative polarity.

Because the thin-film transistor corresponding to the positive signal is switched off earlier than the thin-film transistor corresponding to the negative signal, a time difference exists when switching off the two thin-film transistors. The embodiment of the present application is to obtain the length of the time difference. Optionally, the time difference may be an average of or a middle of time differences obtained by switching off the thin-film transistor for many times for the current row, or may be other value.

Optionally, the length of the time difference may be between 0.5 microsecond (including 0.5 microsecond) and 1 microsecond (including 1 microsecond). In the present embodiment, the length of the time difference can be 0.6 microsecond, 0.7 microsecond, microsecond or 0.9 microsecond.

In the embodiment of the present application, the first predetermined time length is equal to the second predetermined time length. That is, in the pixel charging method of the present application, during the first frame of image, the positive signal is inputted to a part of the data lines, and after the first predetermined time length, the negative signal is inputted to the other data lines, and in such a way, the phase of the positive and negative signals is changed (positive polarity is at the front and negative polarity is at the rear); during the second frame of image, the negative signal is inputted to a part of the data lines, and after the second predetermined time length, the positive signal is inputted to the other data lines, and in such a way, the phase of the positive and negative signals is changed (negative polarity is at the front and positive polarity is at the rear). That is, during the first frame of image, the power source voltage will drift based on the polarity and has a first time of power supply interference; during the second frame of image, the power source voltage will drift based on the polarity and has a second time of power supply interference. By cancelling each other out for the two times of interference, it is ensured that the entire charging rate is high as well as it is avoided that horizontal crosstalk when images are displayed.

Figure 7:
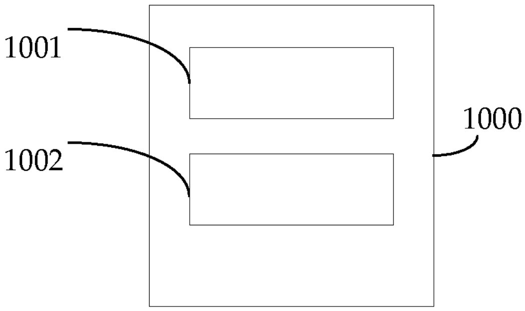
FIG. 7 is a schematic diagram illustrating the structure of a display panel according to an embodiment of the present application.

FIG. 7 is a schematic diagram illustrating the structure of a display panel according to an embodiment of the present application. As shown in FIG. 7, the embodiment of the present application further relates to a display panel 1000, which includes a first charging module 1001 and a second charging module 1002. The first charging module 1001 is configured to, during a first frame of image, input a positive signal to the first data line, and after a first predetermined time length, input a negative signal to the second data line. The second charging module 1002 is configured to, during a second frame of image, input the negative signal to the first data line, and after a second predetermined time length, input the positive signal to the second data line. It needs to be noted that the display panel of the embodiment of the present application uses the afore-described pixel charging method, which can be referred to above descriptions and is not repeated herein.

In the display panel of the present application, during the first frame of image, the positive signal is inputted to a part of the data lines, and after the first predetermined time length, the negative signal is inputted to the other data lines, and in such a way, the phase of the positive and negative signals is changed (positive polarity is at the front and negative polarity is at the rear); during the second frame of image, the negative signal is inputted to a part of the data lines, and after the second predetermined time length, the positive signal is inputted to the other data lines, and in such a way, the phase of the positive and negative signals is changed (negative polarity is at the front and positive polarity is at the rear). That is, during the first frame of image, the power source voltage will drift based on the polarity and has a first time of power supply interference; during the second frame of image, the power source voltage will drift based on the polarity and has a second time of power supply interference. By cancelling each other out for the two times of interference, it is ensured that the entire charging rate is high as well as it is avoided that horizontal crosstalk when images are displayed.

The pixel charging method and the display panel provided in the embodiments of the present application are described in detail above. The principle and implementation of the present application are described herein through specific examples. The description about the embodiments of the present application is merely provided to help understanding the method and core ideas of the present application. In addition, persons of ordinary skill in the art can make variations and modifications to the present application in terms of the specific implementations and application scopes according to the ideas of the present application. Therefore, the content of specification shall not be construed as a limit to the present application.

The invention claimed is:

1. A pixel charging method, applied to a display panel, the display panel comprising a pixel array, a first data line and a second data line, both the first data line and the second data line electrically connected to the pixel array, the method comprising:

during a first frame of image, inputting a positive signal to the first data line, and after a first predetermined time length, inputting a negative signal to the second data line; and during a second frame of image, inputting the negative signal to the first data line, and after a second predetermined time length, inputting the positive signal to the second data line; and the first predetermined time length is equal to the second predetermined time length; both the first predetermined time length and the second predetermined time length are between 0.5 microsecond and 1 microsecond.

2. The pixel charging method of claim 1, wherein the step of during a first frame of image, inputting a positive signal to the first data line, and after a first predetermined time length, inputting a negative signal to the second data line comprises:

switching on thin-film transistors of a current row of pixels;

inputting the positive signal to the first data line;

after the first predetermined time length, inputting the negative signal to the second data line;

switching off the thin-film transistors of the current row of pixels.

3. The pixel charging method of claim 2, wherein before the step of switching on thin-film transistors of a current row of pixels, the method further comprises:

obtaining a time difference between the time to switch off the thin-film transistor corresponding to the first data line inputted with the positive signal and the time to switch off the thin-film transistor corresponding to the second data line inputted with the negative signal, wherein the first predetermined time length is the length of the time difference.

4. The pixel charging method of claim 2, wherein the step of switching off the thin-film transistors of the current row of pixels comprises:

suspending or stopping transmitting a gate signal to the current row of pixels;

postponing switching off the thin-film transistor corresponding to the first data line inputted with the positive signal until a first time length is passed;

postponing switching off the thin-film transistor corresponding to the second data line inputted with the negative signal until a second time length is passed, wherein the second time length is greater than the first time length.

5. The pixel charging method of claim 1, wherein the step of during a second frame of image, inputting the negative signal to the first data line, and after a second predetermined time length, inputting the positive signal to the second data line comprises:

switching on thin-film transistors of a current row of pixels;

inputting the negative signal to the first data line;

after the second predetermined time length, inputting the positive signal to the second data line;

switching off the thin-film transistors of the current row of pixels.

6. The pixel charging method of claim 5, wherein before the step of switching on thin-film transistors of a current row of pixels, the method further comprises:

obtaining a time difference between the time to switch off the thin-film transistor corresponding to the first data line inputted with the negative signal and the time to switch off the thin-film transistor corresponding to the second data line inputted with the positive signal, wherein the second predetermined time length is the length of the time difference.

7. The pixel charging method of claim 5, wherein the step of switching off the thin-film transistors of the current row of pixels comprises:

suspending or stopping transmitting a gate signal to the current row of pixels;

postponing switching off the thin-film transistor corresponding to the first data line inputted with the negative signal until a first time length is passed;

postponing switching off the thin-film transistor corresponding to the second data line inputted with the positive signal until a second time length is passed, wherein the second time length is greater than the first time length.

8. A pixel charging method, applied to a display panel, the display panel comprising a pixel array, a first data line and a second data line, both the first data line and the second data line electrically connected to the pixel array, the method comprising:

during a first frame of image, inputting a positive signal to the first data line, and after a first predetermined time length, inputting a negative signal to the second data line; and during a second frame of image, inputting the negative signal to the first data line, and after a second predetermined time length, inputting the positive signal to the second data line.

9. The pixel charging method of claim 8, wherein the first predetermined time length is equal to the second predetermined time length.

10. The pixel charging method of claim 8, wherein the step of during a first frame of image, inputting a positive signal to the first data line, and after a first predetermined time length, inputting a negative signal to the second data line comprises:

switching on thin-film transistors of a current row of pixels;

inputting the positive signal to the first data line;

after the first predetermined time length, inputting the negative signal to the second data line;

switching off the thin-film transistors of the current row of pixels.

11. The pixel charging method of claim 10, wherein before the step of switching on thin-film transistors of a current row of pixels, the method further comprises:

obtaining a time difference between the time to switch off the thin-film transistor corresponding to the first data line inputted with the positive signal and the time to switch off the thin-film transistor corresponding to the second data line inputted with the negative signal, wherein the first predetermined time length is the length of the time difference.

12. The pixel charging method of claim 10, wherein the step of switching off the thin-film transistors of the current row of pixels comprises:

suspending or stopping transmitting a gate signal to the current row of pixels;

postponing switching off the thin-film transistor corresponding to the first data line inputted with the positive signal until a first time length is passed;

postponing switching off the thin-film transistor corresponding to the second data line inputted with the negative signal until a second time length is passed, wherein the second time length is greater than the first time length.

13. The pixel charging method of claim 8, wherein the step of during a second frame of image, inputting the negative signal to the first data line, and after a second predetermined time length, inputting the positive signal to the second data line comprises:

switching on thin-film transistors of a current row of pixels;

inputting the negative signal to the first data line;

after the second predetermined time length, inputting the positive signal to the second data line;

switching off the thin-film transistors of the current row of pixels.

14. The pixel charging method of claim 13, wherein before the step of switching on thin-film transistors of a current row of pixels, the method further comprises:

obtaining a time difference between the time to switch off the thin-film transistor corresponding to the first data line inputted with the negative signal and the time to switch off the thin-film transistor corresponding to the second data line inputted with the positive signal, wherein the second predetermined time length is the length of the time difference.

15. The pixel charging method of claim 13, wherein the step of switching off the thin-film transistors of the current row of pixels comprises:

suspending or stopping transmitting a gate signal to the current row of pixels;

postponing switching off the thin-film transistor corresponding to the first data line inputted with the negative signal until a first time length is passed;

postponing switching off the thin-film transistor corresponding to the second data line inputted with the positive signal until a second time length is passed, wherein the second time length is greater than the first time length.

16. The pixel charging method of claim 8, wherein both the first predetermined time length and second predetermined time length are between 0.5 microsecond and 1 microsecond.

17. A display panel, comprising:

a first charging module, configured to, during a first frame of image, input a positive signal to the first data line, and after a first predetermined time length, input a negative signal to the second data line; and a second charging module, configured to, during a second frame of image, input the negative signal to the first data line, and after a second predetermined time length, input the positive signal to the second data line.

* * * * *